United States Patent [19]
Pearne et al.

[11] 3,917,081
[45] Nov. 4, 1975

[54] BRICK HANDLING SYSTEM

[75] Inventors: Frank S. Pearne, San Gabriel; Florentin J. Pearne, Blue Jay; William P. Osborn, Whittier; Terance M. King, Placentia; Joseph A. Guzzetta, Newport Beach, all of Calif.

[73] Assignee: Aircraft Mechanics, Inc., Downey, Calif.

[22] Filed: Jan. 9, 1974

[21] Appl. No.: 431,967

[52] U.S. Cl. ............... 214/6 A; 198/34; 214/1 Q; 214/8.5 C
[51] Int. Cl.² .................................... B65G 57/26
[58] Field of Search ...... 214/6 A, 6 DK, 6 H, 8.5 C, 214/1 Q; 198/34; 294/63 R

[56] References Cited
UNITED STATES PATENTS

| | | | |
|---|---|---|---|
| 3,388,815 | 6/1968 | Lingl | 214/6 A |
| 3,392,851 | 7/1968 | Pearne et al. | 214/6 A |
| 3,620,383 | 11/1971 | Ingram et al. | 214/6 A |
| 3,656,634 | 4/1972 | Pearne et al. | 214/6 A |
| 3,669,283 | 6/1972 | Brown | 214/8.5 C |
| 3,731,785 | 5/1973 | Stuart | 214/6 A X |
| 3,792,784 | 2/1974 | Mosterd | 214/6 H |
| 3,811,549 | 5/1974 | Preisig | 198/34 X |

*Primary Examiner*—Robert J. Spar
*Assistant Examiner*—Leslie J. Paperner
*Attorney, Agent, or Firm*—McNenny, Farrington, Pearne & Gordon

[57] ABSTRACT

A brick handling system is disclosed for automatically unloading grids of bricks from a kiln car and for forming such bricks in a stack suitable for easy handling, storage, and shipment. A first transfer grips a plurality of grids and transfers such grids to a spreader table. The spreader table operates to insure alignment of the bricks in rows and to separate the rows by a predetermined distance. A puller slides the bricks across a transfer table onto a marshaling table which positions the rows of bricks for stacking. The system is operable to form voids in selected rows of bricks so that voids are provided in the finished stack. A storage system is provided for temporarily supporting a void layer until it is required in a subsequent stack.

13 Claims, 8 Drawing Figures

BRICK HANDLING SYSTEM

BACKGROUND OF THE INVENTION

This invention relates generally to automated systems for handling bricks or the like and more particularly to a novel and improved system for unloading bricks from a kiln car and for stacking such bricks to form a package permitting easy storage, handling and shipment.

PRIOR ART

Various systems have been developed to reduce the labor required in the manufacture and packaging of bricks or the like. The U.S. Pat. Nos. 2,944,687; 3,113,682; 3,388,815; 3,625,375; 3,392,851; 3,487,959; 3,491,901; and 3,601,266 disclose examples of such systems. The latter four of such patents are assigned to the assignee of the present invention. The U.S. Pat. Nos. 3,487,959 and 3,601,266 both disclose systems for unloading kiln cars provided with stacks of grids and for moving such bricks to a stacking location. The U.S. Pat. Nos. 3,392,851 and 2,491,901 disclose stacking systems for forming stacks of bricks which are subsequently strapped into stable packages which are suited for storage, handling and shipment of the bricks.

SUMMARY OF THE INVENTION

In accordance with the present invention, a novel and improved system is provided for unloading grids of bricks from a kiln car or the like and for forming stacks of such bricks suitable for packaging in a strapper or the like. In the preferred illustrated embodiment of the present invention, a gripper transfer operates to grip entire grids of bricks from stacks of grids and positions the grids on a spreader table in a predetermined orientation. The spreader table functions to insure that the bricks positioned thereon are in aligned rows and to move the rows apart to a spaced condition. A puller functions to move the spaced rows from the spreader table to a marshaling platform where the bricks are segregated and positioned for gripping and transfer to a stacker elevator. A gripper transfer functions to sequentially grip layers of bricks located on the marshaling platform and to sequentially position such layers on the stacker elevator until the desired stack is provided thereon.

From the stacking platform, the stacks of bricks are usually transferred to a strapper which ties the stacks in stable packages suitable for easy storage, handling and shipment. The system is arranged to produce spaces or voids in preselected layers so that the ultimate package is provided with voids to receive the fork of a lift truck or the like to facilitate the handling of the complete package.

The various components are arranged to permit the simultaneous handling of the relatively large number of bricks so that a large number of bricks can be handled without requiring the various components of the total system to function at high cyclic rates. With a handling system in accordance with the present invention, it is possible to mechanically handle large numbers of bricks in a reliable manner to virtually eliminate the labor in the unloading and stacking of bricks.

DETAILED DESCRIPTION OF THE DRAWINGS

Figure 1:
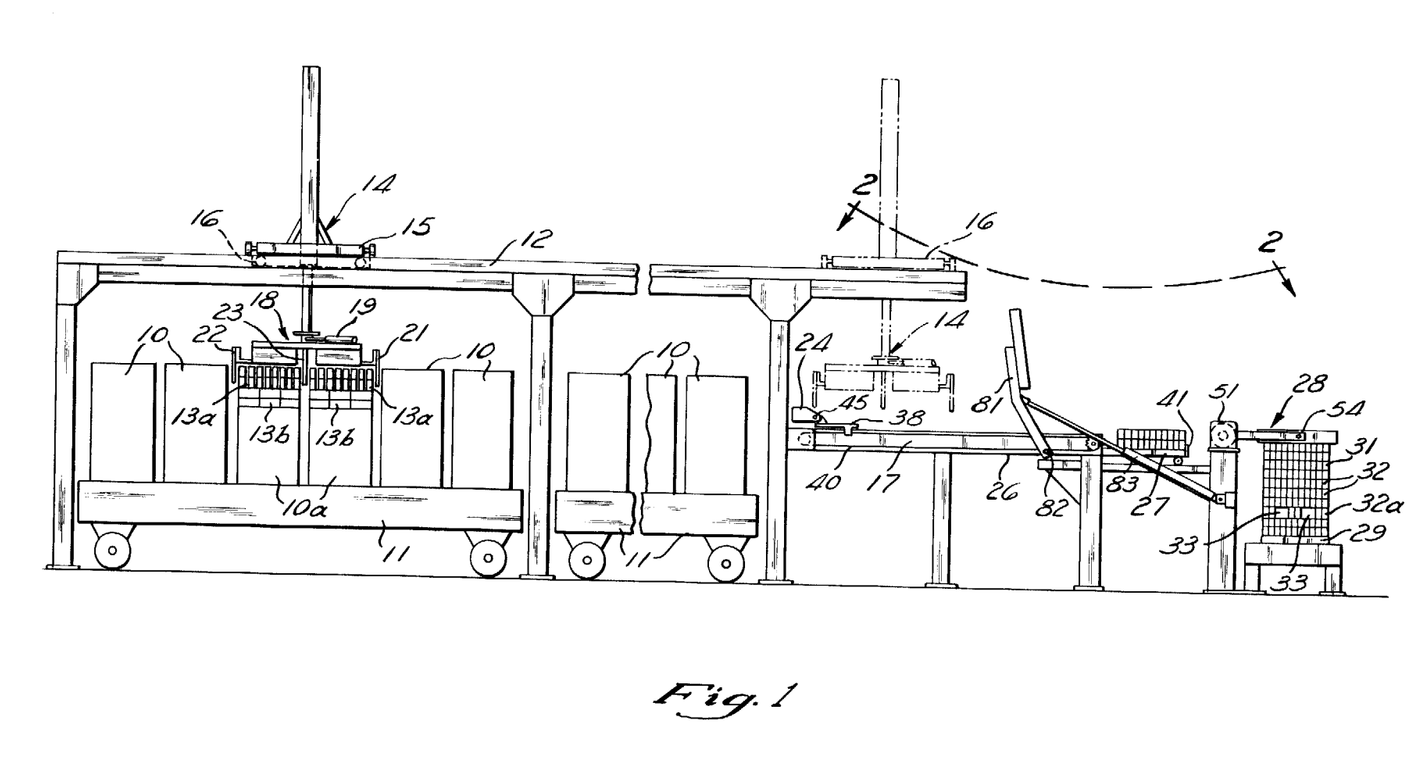
FIG. 1 is a side elevation illustrating the general arrangement of a brick handling system in accordance with the present invention.

Referring to FIG. 1, the preferred embodiment of a handling system in accordance with the present invention is supplied with bricks positioned in stacks 10 resting on kiln cars 11 which deliver the bricks to the unloader stacker. Usually, the stacks are formed on the kiln cars 11 while the bricks are in the green state and are carried by the kiln cars through the firing oven and to the subsequent unloading system. The kiln cars usually move along tracks and are positioned beneath an unloader frame 12 as illustrated.

Each stack 10 includes a plurality of grids consisting of spaced rows of endwise abutting bricks. In FIG. 1, the grids in most of the stacks 10 are not fully illustrated for purposes of simplification. However, it should be understood that each of the stacks includes grids as illustrated in the stacks 10a. Each grid in the illustrated embodiment is a double grid in that it is provided with a lower layer of rows and a similar upper layer with each brick in the upper layer of a grid superposed in vertical alignment with a corresponding brick in the lower layer. Stacks are arranged with each grid oriented in a position at 90° of rotation with respect to the grid immediately above and below the grids in the stacks. Consequently, the grid 13a consists of lengthwise abutting spaced rows extending in a direction normal to the plane of the illustration in FIG. 1, and the grids 13b consisting of spaced rows of endwise abutting bricks extending in a direction parallel to the plane of the illustration.

A gripper transfer 14 operates to grip grids in the stacks 10 and transfers the grids to a spreader table 17. The transfer 14 includes a carriage 16 supported by the frame 12 for movement along the frame 12 from a gripping position over the kiln cars to a delivery position, as illustrated in phantom, over the spreader table 17. Power means (not illustrated) of any suitable type are provided to move the carriage 16 back and forth along the frame 12. Such power means can, for example, include a motor-driven chain drive provided with suitable controls. Mounted on the carriage 16 is a laterally movable secondary carriage 15, which is movable with respect to the primary carriage in a lateral direction.

A gripper assembly 18 is supported by the carriage 15 for vertical movement with respect thereto. The gripper assembly 18 can be rotated back and forth through 90° by an actuator 19 so that it can be properly oriented with respect to the grids being gripped in the stacks. Mounted on the gripper assembly are a pair of laterally movable grippers 21 and 22 which are positioned between adjacent stacks as illustrated in FIG. 1, and are subsequently moved toward each other to slide the rows into abutting engagement and to cooperate with center grippers 23 to permit full gripping of a grid 13a on each side of a center gripper 23. Preferably, the gripper assembly 18 is arranged to permit the simultaneous gripping of the top grid of each of four stacks so that a large number of bricks can be transferred to the spreader table 17 during each cycle of movement of the gripper transfer 14. Reference may be made to the U.S. Pat. Nos. 3,601,266 and 3,656,634 and to the copending application, Ser. No. 406,579, filed Oct. 15, 1973, for a more detailed disclosure of the gripper transfers of this type.

After gripping the grids, the gripper assembly 18 is raised to clear the remaining stacks on the kiln cars 11 and is moved to a position over the spreader table where it is lowered to position the grids on the spreader table. During a subsequent cycle of operation, the gripper transfer 14 returns to a gripping position where additional grids are gripped for transfer to the spreader table. During the transfer movement, the gripper 18 is oriented so that the rows of side abutting bricks extend in the longitudinal direction of the machine.

The spreader table operates, in a manner described in greater detail below, to spread the rows of grids to a predetermined spacing, and a puller 24 operates to pull the rows of bricks across a transfer table 26 to a marshaling platform 27. The marshaling platform 27 is movable from a retracted position in which it is positioned below the transfer table to an extended position in which it extends beyond the end of the transfer table. The puller 24 and the marshalling table 27 are operated to position groups of bricks of predetermined size in a gripping position for subsequent transfer by a stacker transfer 28.

The stacker transfer 28 is movable from a gripping position over the marshaling platorm 27 to a delivery position over a stacker elevator 29. Repeated operation of the stacker transfer 28 sequentially positions layers of bricks on the stacker platform to build the desired stack for subsequent packaging. The stacker elevator 29 moves down progressively as each layer is positioned thereon to position the uppermost layer of the stack in a proper position to receive the subsequent layer. When the stack 31 on the stacker elevator 29 contains a predetermined proper number of layers 32, the stacks are moved off of the stacker elevator 29 to a strapper mechanism (not illustrated) where the stacks are tied into packages of predetermined size and shape for subsequent storage, handling and shipment.

One of the layers 32a is provided with a pair of voids 33 which are sized and positioned so that the finished package can be picked up and moved about by a lift truck or the like having a fork-like structure which can be positioned in the voids. With such a structure, it is possible to mechanically handle the finished package without requiring pallets or the like for each package.

Figure 2:
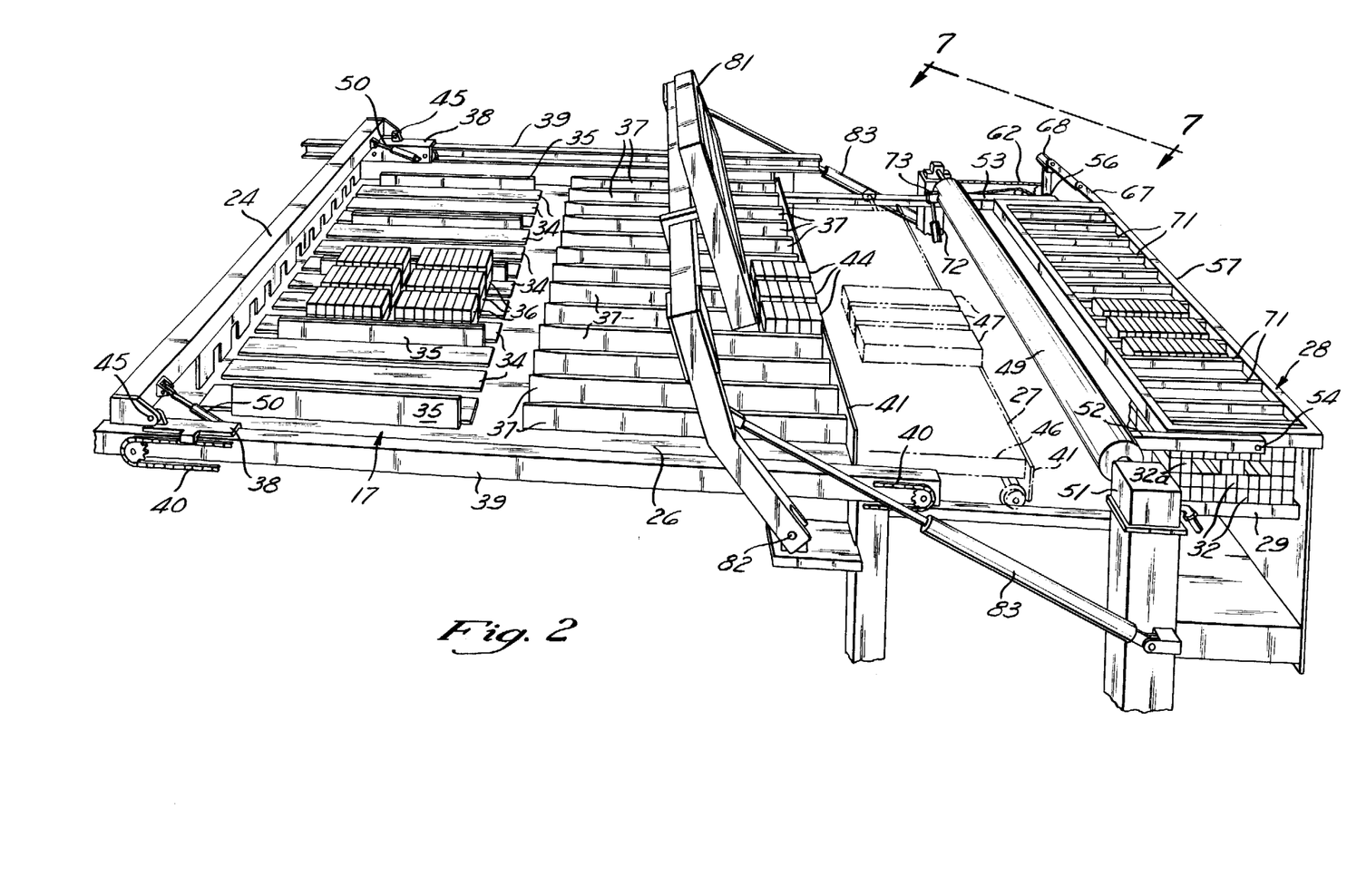
FIG. 2 is an enlarged fragmentary perspective view illustrating the general arrangement of the spreader table and the marshaling platform as well as the transfer mechanisms for moving the bricks to the elevator on which the bricks are stacked.

Referring now to FIGS. 2 through 6, the spreader table 17 includes a plurality of laterally movable support bars 34 each of which is proportioned to receive and support a single row 36 of lateral or side abutting bricks. In the illustrated embodiment, there are 12 support bars 34 arranged in four groups of three bars in each group. In each group, a side plate 35 is carried by the outer bars 34 of the group. In FIG. 2, and in the subsequent perspective views, rows 36 of bricks are illustrated on only three of the support bars 34 for purposes of simplification. However, it should be understood that in normal operation, the gripper transfer 14 positions a row 36 of bricks on each bar 34 so that there are 12 rows 36 on the spreader table 17. As best illustrated by the grids 13b in FIG. 1, each grid includes rows of endwise abutting bricks containing three pairs of bricks in each row. As illustrated by the grids 13a in FIG. 1, there are eight rows of endwise abutting bricks in each grid. Therefore, each layer of each grid contains 24 bricks, and since there are two layers in each grid, there are a total of 48 bricks in each grid.

The gripper transfer 14 operates to position the four grids transferred by the transfer during each of its operating cycles with two grids positioned on each group of spreader bars 34. During one cycle of operation, the gripper transfer deposits the grids on the two groups of bars 34 adjacent one side of the table, and on the subsequent transfer operation, it deposits the grids on the other two groups of bars 34 so that all twelve bars are each provided with a row 36 of bricks. The secondary carriage 15 permits lateral movement of the gripper to properly position the grids on the spreader table.

After the bars 34 are properly loaded by the gripper transfer 14, the two outer bars of each group are moved toward the center bar thereof causing the side plates 35 to engage the adjacent ends of the rows to move them into a compacted group. This eliminates any misalignment in the rows 36 and insures that all of the bricks in each row 36 are properly aligned with other bricks in the row. The spreader bars are then moved apart to produce a predetermined spacing between each of the rows of the bricks 36 on the spreader table. Since there are two grids, each containing 48 bricks on each of the groups of spreader bars 34, and since there are four groups of spreader bars 34, a full compliment of bricks on the spreader table 17 equals 384 bricks in 12 rows 36. The mechanism for moving the groups of support bars 34 toward and away from each other is not illustrated. However, various mechanisms can be provided to move the outer bars of each group toward and away from the center bar of each group through a predetermined travel.

Mounted on the transfer table 36 are guide members 37 which cooperate to form 12 separated chutes with one chute aligned with each row 36 of bricks supported by the spreader table. After the full compliment of rows are properly spread by the spreader table 17, the puller bar 24 is moved to the right as viewed in FIG. 2 to pull the rows along the bars 34 and into the adjacent chute on the transfer table 26. The puller bar 24 is supported at its ends on a carriage 38 which moves along longitudinal frame members 39. A chain drive 40 is connected to move the carriage 38 back and forth along the frame members 39. Any suitable motor such as a hydraulic, pneumatic, or electric motor can be connected to power the chain drive. The puller bar 24 is pivoted at 45 so that it can be raised and lowered by piston and cylinder actuators 43. In the lower position illustrated in FIG. 2, the puller bar is aligned with the rows of bricks 36 so movement of the puller bar 24 to the right operates to slide the rows of bricks into the transfer table 26. The actuators 50 are operable to raise the puller bar up clear of the bricks resting on the spreader table so that interference will not be present on the return of the puller bar to its initial position illustrated in FIG. 2.

The transfer table is provided with sufficient length so that a full compliment of bricks may be moved from the spreader table onto the transfer table to clear the spreader table for subsequent loading by the gripper transfer 14. This permits the gripper transfer 14 to load the spreader table 17 while the preceding compliment of bricks moves through the remaining parts of the stacker.

The marshaling platform 27 illustrated in phantom in FIG. 2 and in full line in FIGS. 3 through 6 is supported by the machine frame for movement between a position immediately under the transfer table 26 and in an extended position in which it projects up beyond the end of the transfer table 26. A drive, for example, a chain drive, is used to power the marshaling table for movement between such two positions.

Figure 5:
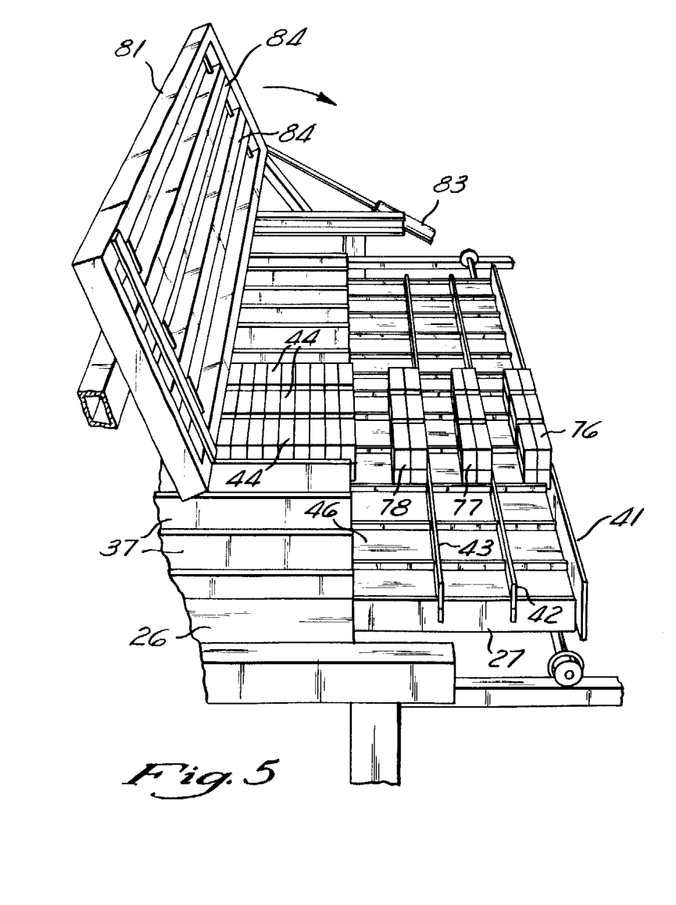
FIG. 5 is a fragmentary perspective view of the marshaling platform with the layers of bricks positioned thereon in spaced relationship to permit the formation of the voids in the finished stack.
Figure 6:
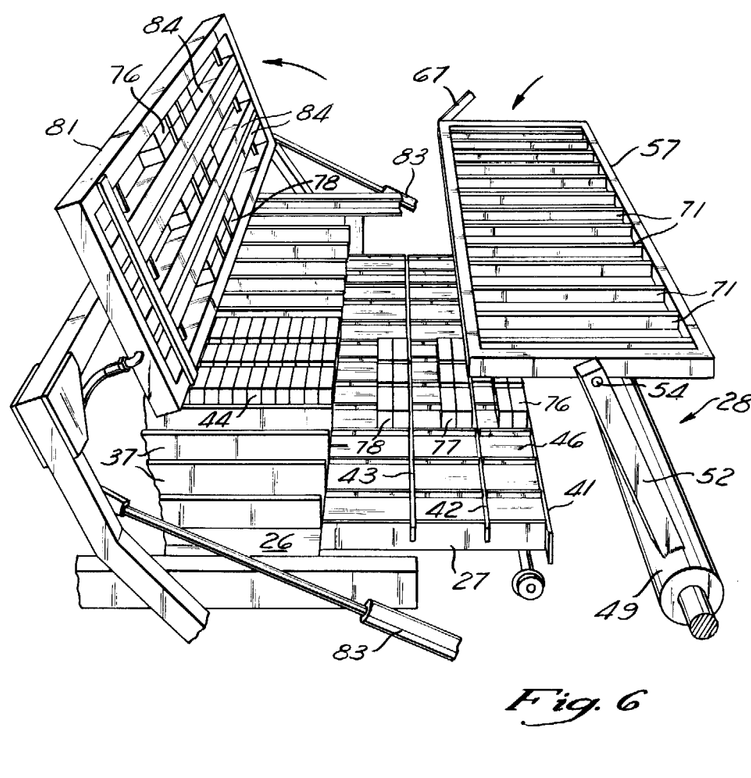
FIG. 6 is a fragmentary perspective view similar to FIG. 5 but illustrating the mechanism after one layer of bricks are gripped and removed for storage until they are needed for a subsequent stack.

Mounted on the marshaling platform are three vertically movable gates 41, 42, and 43. Each of the gates 41, 42, and 43 is connected to an associated actuator, such as a piston and cylinder actuator, which is operable to separately raise and lower the gates between the raised position of FIG. 5 and the lowered position of FIG. 6. When the gates 41, 42, and 43 are in their lowered position, they do not project above the surface of the marshaling platform as illustrated in FIG. 6, but when the gates are raised, they project up above the surface of the marshaling platform 27 as illustrated in FIG. 5.

Figure 3:
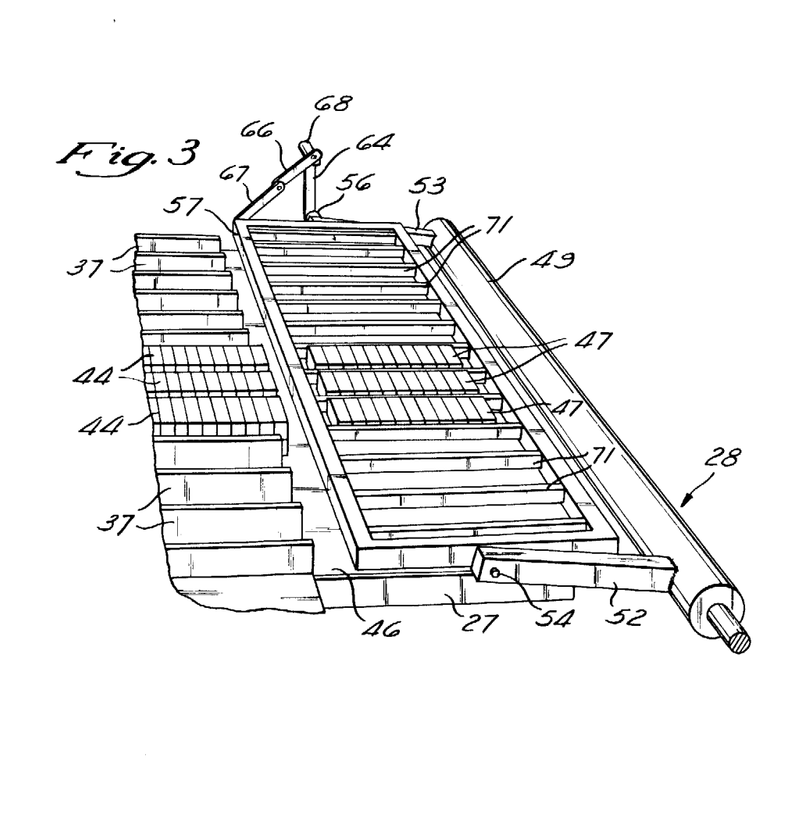
FIG. 3 is an enlarged fragmentary perspective view illustrating the stacker transfer in the gripping position in which layers of bricks are gripped for transfer to the stack elevator.
Figure 4:
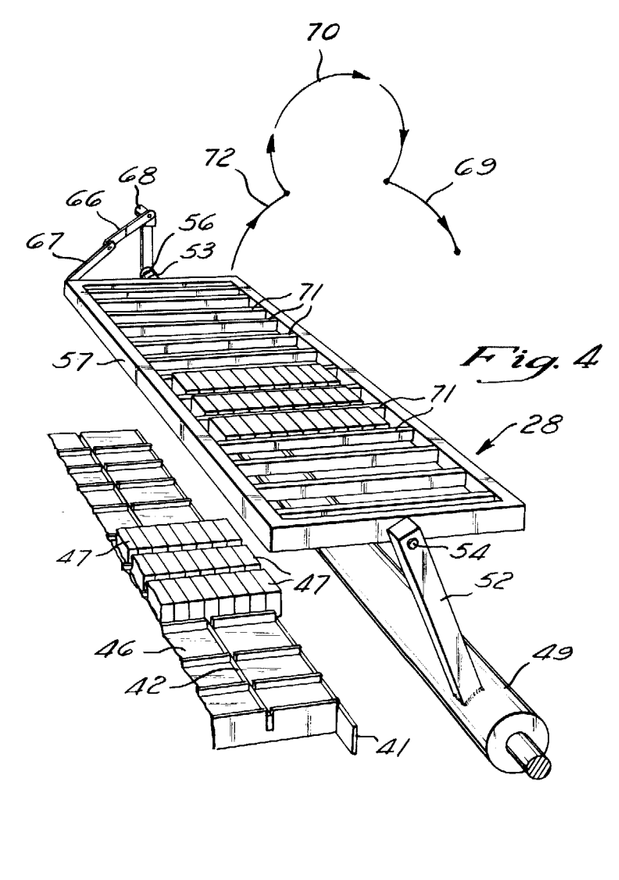
FIG. 4 is a fragmentary perspective view similar to FIG. 3 but illustrating the gripper transfer in an intermediate position.

The marshaling platform functions in combination with the puller 24 to position the groups of bricks which constitute the layers 32 and 32a in the stack 31 for gripping and transfer by the stacker transfer 28. FIGS. 2, 3, and 4 illustrate the manner of operation of the marshaling platform when a full layer 32 is to be positioned for transfer to the stack 31 by the stacker transfer 28. Initially, the marshaling platform 27 is located in its retracted position in which it extends under the transfer table 26. The gate 41 is raised as best illustrated in FIG. 2, and the other gates 42 and 43 are lowered so as to prevent interference with the transfer table. It should be noted that in the position and condition illustrated in FIG. 2, rows of bricks 44 remaining from the previous compliment of bricks are located on the transfer table 26. It again should be remembered that 12 rows of bricks are present in the twelve chutes defined by the guide 37, and that the three rows 44 are illustrated as representative rows to simplify the drawing and to provide a clearer understanding of the structure of the present invention.

While the gate 41 is in the raised position adjacent to the edge of the transfer table 26, the puller 24 is operated to move to the right and pull the rows 36 onto the table 26 until the forward end of the rows 36 engage the rearward ends of the rows 44. In this intermediate condition, the puller 24 engages the rearward end of the rows, and the forward ends engage the gate 41. Therefore, continued movement of the puller causes the marshaling table 27 to be moved to the right and causes the forward bricks of the combined rows to move from the transfer table 26 onto the marshalling table 27. During this stage of the movement, the drive for the marshaling table 27 is not operated, and the movement of such table is caused by the movement of the rows created by the puller 24. The support surface 46 of the marshaling platform 27 is positioned immediately below the support surface of the transfer table 26 so that the bricks do not have to drop down any appreciable distance as they move from the transfer table onto the marshaling platform.

The operation of the puller 24 continues until a predetermined number of bricks have been pushed off of the end of the transfer table 26 and onto the surface 46 of the marshaling platform 27. In the illustrated embodiment, such predetermined number of bricks provides rows containing eleven bricks in each row 47. When the eleven bricks have been transferred to the marshaling table, the pusher 24 stops and the drive for the marshaling table 27 is energized to move the rows supported by the marshaling platform clear of the transfer table, and the rows 44 supported thereby. When the marshaling table is fully loaded and moves to its extended position as illustrated in FIGS. 2 and 3, the gate 41 lowers and two layers of bricks are positioned for transfer to the stacking platform by the stacker transfer 28. Each layer consists of 12 rows of 11 bricks with 132 bricks in the lower layer, and 132 bricks in the upper layer.

Figure 7:
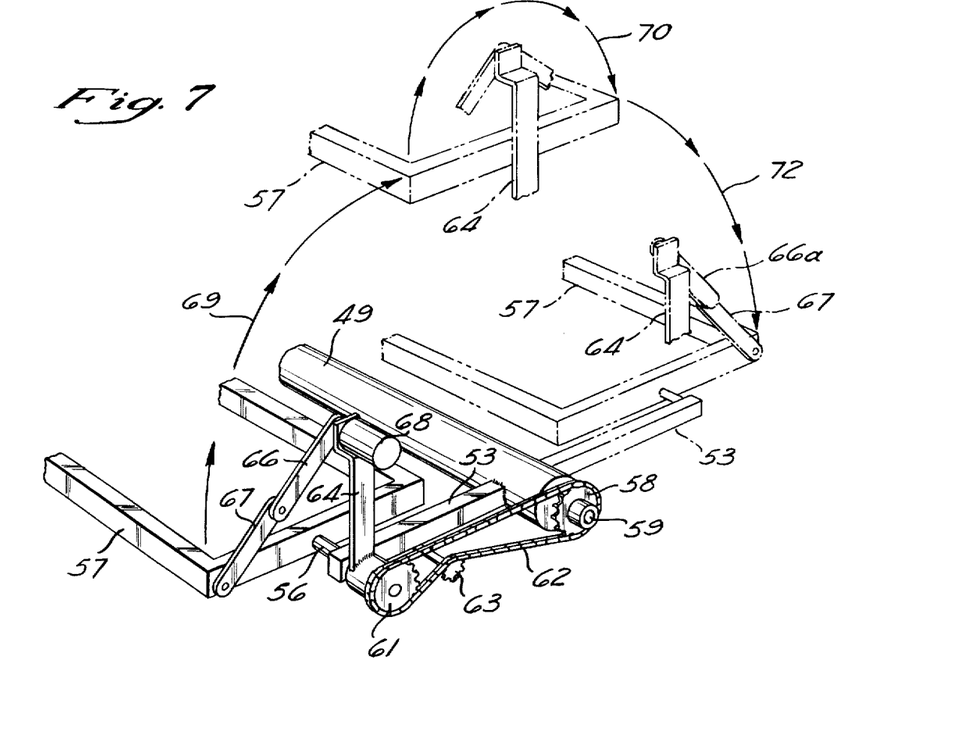
FIG. 7 is a schematic perspective illustrating the mechanism for inverting the stacker transfer during its movement from the gripping position to its delivery position.

The transfer gripper 28 includes a torque shaft 49 supported at its ends for oscillating rotation through an angle equal to substantially 180°. A rotary motor 51 is connected to cause such oscillating rotation of the shaft 49. A pair of support arms 52 and 53 extend laterally from the shaft 49 and provide pivots 54 and 56 at their outer ends for a gripper frame 57. This frame 57 is generally rectangular in shape and is supported along its center line by the pivot 54 and 56 for oscillating rotation with respect to the support arms 52 and 53. A mechanism, best illustrated in FIG. 7, is provided to control the orientation of the frame 57 with respect to the support arm 52 and 53. This mechanism includes a sprocket gear 58 which is positioned around the pivot support 59 for the shaft 49, but is connected to the frame of the machine so that it cannot rotate. A second sprocket gear 61 is carried by the pivot 56 and is free to rotate with respect to the frame 57 and the arm 53. A chain 62 extends around the two sprocket gears 58 and 61 and is tensioned by a sprocket gear 63. The two sprockets 58 and 61 have the same diameter. Consequently, as the sprocket 61 is carried by the arm 53, back and forth around the axis of the shaft 49, the orientation of the sprocket 61 is maintained constant with respect to the fixed sprocket 58.

An upstanding arm 64 is fixed to the sprocket 61, so it remains in the upstanding position regardless of the movement of the shaft 49. Connected between the upper end of the arm 64 are a pair of links 66 and 67. A rotary oscillating motor 68 is mounted on the upstanding support arm 64 and is connected to the links 66 to effect inversion of the frame 57 when desired. In one extreme position, the two links 66 and 67 are in alignment as shown in full line in FIG. 7, and the frame 57 is horizontal. The chain connection maintains the support arm 64 in the vertical upright position and therefore causes the frame to be maintained in the horizontal position as long as the two links 66 and 67 are aligned as illustrated in full line.

Inversion of the frame 57 is accomplished by operating the motor 68 to rotate the link 66 from the full line position of FIG. 7 to the phantom line position 66a in which the link 66 is again in alignment with the link 67, but the frame is turned through 180° of rotation about the pivot 54 and 56. Usually, the motor 68 is operated to turn the frame over or invert the frame while the arms 52 and 53 are in a generally upright position. This is schematically illustrated by the arrows 69 which indicate that the frame moves from the full line position to the first phantom position while being maintained in a horizontal position and then is inverted as indicated by the arrows 70 before the completion of the movement along the line indicated by the arrows 72 to the second phantom position of FIG. 7. With this structure, it is possible to provide movement of the gripper frame 57 from the gripping position to the delivery position over the stacking elevator such that the frame is not inverted or to invert the frame when it is desired to invert selected layers of bricks positioned in a stack on the elevator.

The frame 57 is provided with thirteen gripper assemblies 71 each of which includes a support bar and a tubular inflation element. When the inflation element is not pressurized, it lays against the associated bar, and the gripper assembly 71 is sufficiently narrow to allow the grippers to move between the rows 47 resting on the marshaling platform as illustrated in FIG. 3. While the frame is in the position of FIG. 3, the grippers are inflated to cause gripping of the ends of each brick within each row 47. The motor 51 is then operated to rotate the shaft and in turn move the frame through an arcuate path to a position over the stacking elevator as illustrated in FIG. 2. FIG. 4 illustrates the frame 57 in an intermediate position between the gripping position and the delivery position.

If it is required to invert the layer being transferred the frame is inverted by the motor 68 as represented by the arrows in FIG. 4. It should be noted that the illustrated gripper frame 57 is arranged to transfer a single layer consisting of 12 rows of bricks in which each row contains 11 bricks. Consequently, the gripper frame must be moved back and forth in two complete cycles to remove the two full layers of bricks resting on the marshaling platform 27.

When the gripper frame is in the delivery position of FIG. 2 where each row of bricks is either immediately above the stacking elevator or immediately above the top layer of the stack on the stacking elevator, the grippers 71 are exhausted, and the rows are released to rest in the stack. Normally, after each delivery of a layer of bricks to the stack, the stacking elevator is lowered to position the uppermost layer thereon in position to receive a subsequent layer. A piston and cylinder actuator 72 is connected to a projecting arm 73 projecting from the shaft 49 in a direction opposite the arms 52 and 53 to provide a counterbalancing force so that the motor 51 is not required to supply sufficient torque to overcome the entire weight of the frame and bricks supported thereby.

As mentioned previously, a selected layer 32a within the stack is formed with voids 33. The void forming function is best illustrated in FIGS. 5 and 6. In the illustrated embodiments, the layer with the voids contains two abutting bricks 76 on one side of the stack, a pair of centrally located bricks in each row at 77, and a pair of bricks 78 positioned for transfer to the other side of the stack. The central pair of bricks 77 is spaced from both the pairs 76 and 78 by a distance which ulimately becomes the void in the stack.

The layer arrangement illustrated in FIG. 5 is accomplished in the following manner. The marshaling platform 27 is moved to a position underneath the transfer table 26 in the same manner followed for the formation of full layers. The gate 41 is raised as illustrated in FIG. 2 while the marshaling platform 27 is in the retracted position. The puller is operated to cause the bricks at the forward end of the rows 44 to engage the gate 41 and move the marshaling platform 27 to the right until the first pair of bricks 76 in each row is transferred from the transfer table 26 to the marshaling platform 27. The puller 24 is then stopped, and the power drive for the marshaling table is operated to move the marshaling table until the gate 42 is just clear of the end of the transfer table.

The marshaling table drive is then stopped, the gate 42 is raised, and the puller 24 is operated to move the forward bricks of the rows 44 into engagement with the gate 42 and cause movement of the marshaling platform 27 to the right until the pairs of bricks 77 are resting on the marshaling platform. At this time, the drive of the puller 24 is shut off and the drive on the marshaling table is operated to move the marshaling table again to the right until the gate 42 is just past the end of the transfer table 26. The gate 43 is then raised while the marshaling table drive is shut off, and the puller drive is operated to cause the forward end brick in the rows 44 to engage the gate 43 and move the marshaling table to the right until the pair of bricks 78 of each row are moved onto the marshaling table. The drive of the puller is then stopped, and the marshaling table drive is energized to move the marshaling table to the position of FIG. 5. At this time, all of the gates 41, 42, and 43 are lowered.

Since the group of bricks resting on the marshaling table 27 in the condition of FIG. 5 contains an upper layer of bricks and a lower layer of bricks, and since only a single layer in a given stack is provided with the spacing for the voids, a storage gripper frame 81 is provided to remove one of the layers and to store such layer until a subsequent stack requires a spaced void layer. The storage gripper frame 81 is supported on a pivot 82 for movement between a storage position and a gripping position by a pair of actuators 83. As best illustrated in FIGS. 5 and 6, the storage gripper frame 81 is provided with longitudinally extending inflatable grippers 84 which fit between the pairs of bricks 76, 77, and 78 when the frame is moved down to a position over the marshaling platform. While in such position, the grippers are inflated to grip all of the bricks in the upper layer of bricks on the marshaling table. The actuator 83 is then operated to return the storage frame to the storage position as illustrated in FIG. 6, thus removing temporarily the upper layer of spaced bricks.

The gripper frame 28 is then operated to grip the lower layer and to transfer to the stack where it is deposited on the uppermost layer then supported by the stacking elevator. The machine is then operated to supply full layers of bricks to complete the stack above the voids 33.

Figure 8:
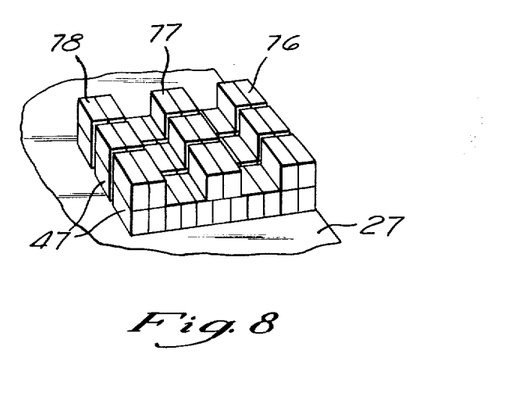
FIG. 8 is a fragmentary perspective illustrating the storage layer after it is returned to the marshaling platform for subsequent transfer to the stack.

Once the stack is completed and removed, a subsequent stack is started on the platform by positioning two full layers 32 on the stacker elevator so that the machine is in position to receive the subsequent void layer. When the subsequent void layer is required, a storage frame 81 is again returned to a position immediately over the marshaling platform 27, and the stored void layer is released to rest on a full layer then present on the marshaling platform, as illustrated in FIG. 8. The stacker frame 28 then operates to transfer the void layer to the stack being formed on the stacking elevator.

In the preferred illustrated embodiment in which the elevator transfer frame carries a single layer from the marshaling platform to the stack during each cycle of operation, the stack should be formed with an odd number of full layers so that a full lower layer will be present on the marshaling platform when the stored void layer is returned to the marshaling platform for transfer to the stack. It is apparent that since the gripper transfer 28 is arranged to grip an upper layer and subsequently grip a lower layer, the motor 51 must be capable of properly positioning the frame 57 for gripping of the particular layer being gripped in a given cycle. In some instances, however, it may be desired to provide a system in which the gripper frame 57 is capable of gripping and transferring both layers in a single operating cycle.

It is apparent that a combined unloader stacker in accordance with the present invention can handle a large number of bricks in a given period of time without requiring excessively rapid component movement since relatively large numbers of bricks are handled during each cycle of operation. Further, the operation is arranged to occur simultaneously to increase the output of the machine. For example, the gripper transfer 14 operates the transfer grids to the spreader table while the puller, the marshaling table, and the elevator transfer are operating to form a stack of bricks previously deposited on the spreader table.

Although a preferred embodiment of this invention is illustrated, it should be understood that various modifications and rearrangements of parts may be resorted to without departing from the scope of the invention disclosed and claimed herein.

What is claimed is:

1. A system for forming layers of bricks each containing spaced rows of laterally abutting bricks comprising a first support supplied with a plurality of rows of abutting bricks extending to one edge thereof, a marshaling support substantially coplanar with said first support and movable in a direction aligned with said rows, first power means operable to move bricks in said rows past said edge onto said marshaling support and causing said marshaling support to move with the bricks thereon until a predetermined number of bricks from each row pass said edge, and a second power means operable to move said marshaling support in said direction to a predetermined position so that all bricks supported thereby are spaced from said edge and the rows of bricks remaining on said transfer support.

2. A system as set forth in claim 1 wherein gate means are provided on said marshaling support positioned to engage the forward brick of each row to properly position the brick on said marshaling support and to insure movement of said marshaling support with the bricks thereon.

3. A system as set forth in claim 2 wherein a plurality of gate means are provided on said marshaling support, and said gates, first power means and second power means operate to form voids in the rows of bricks on said marshaling support.

4. A system as set forth in claim 1 wherein said first power means and said second power means alternately operate to produce rows of bricks on said marshaling support with void spaces intermediate the rows of bricks on said marshaling support.

5. A system as set forth in claim 4 wherein said rows contain upper and lower layers of superposed pairs of bricks resting one on another, and storage means are provided to remove one layer of bricks from said marshaling support and to subsequently reposition said one layer on said marshaling support.

6. A system as set forth in claim 5 wherein stacking means are provided which are operable to remove layers of bricks from said marshaling support and to position said layers in a stack of layers.

7. A system as set forth in claim 1 wherein stacking means are provided which are operable to remove layers of bricks from said marshaling support and to position said layers in a stack of layers.

8. A system for handling bricks or the like comprising a supply of stacks of bricks each including a grid of bricks in spaced endwise abutting rows, a spreader table, a first transfer operable to grip entire grids and to position them on said spreader table in rows of laterally abutting bricks, said spreader table operating to compress said rows to insure proper alignment of the bricks therein and to thereafter spread said rows to a predetermined space relationship, a marshaling table, second transfer means operable to move said spaced rows onto said marshaling table, movement of bricks onto said marshaling table causing movement thereof with the bricks thereon in the direction of said rows, power means operating to move said marshaling table in said direction to space the bricks thereon from the remaining bricks, and stacking means operable to transfer bricks from said marshaling table to a stack of bricks.

9. A system for handling bricks or the like as set forth in claim 8 wherein a transfer table is located intermediate said spreader table and said marshaling table across which bricks are moved by said second transfer means.

10. A system for handling bricks or the like as set forth in claim 9 wherein retractable gates are provided to accurately locate bricks on said marshaling table.

11. A system for handling bricks or the like comprising supply means operable to supply a double row of bricks to a gripping position with an upper row resting on and vertically aligned with a lower row, a stacker platform operable to sequentially receive said rows in a stack, and a gripper transfer operable on a first cycle to grip said upper rows and transfer said upper rows to said stacker platform and thereafter in a subsequent cycle to grip said lower rows and position said lower rows on said stacker platform, said gripper transfer being selectively operable to invert selected rows during the transfer from said gripping position to said stacker platform, said supply means being selectively operable to supply double rows of bricks to said gripping position in which void spaces are provided between selected bricks in said double row, and storage means are operable to remove one of said rows of bricks containing voids therein and to reposition said one row at said gripping position after storage.

12. A brick stacker or the like comprising a marshaling support, means operable to position spaced rows of abutting brocks on said marshaling support with each row containing a lower layer and an upper layer superposed thereon, a stacking elevator operable to receive layers of bricks in a stack of layers and to position the top layer thereon at a predetermined level, and a gripper transfer operable to grip layers on said marshaling support and to transfer said layers to said stack while inverting selected layers before positioning them in said stack, void means for forming voids in selected layers on said marshaling support, and storage means for removing one void layer from said marshaling support and to subsequently return it to said marshaling support.

13. A system for handling bricks or the like comprising supply means operable to supply a double row of bricks to a gripping position with an upper row resting on and vertically aligned with a lower row, a stacking platform operable to sequentially receive said rows in a stack, and a gripper transfer for transferring rows from said gripping position to said stacking platform, said gripping transfer including a gripper frame for gripping and releasing said rows, and a powered frame support for moving said gripper frame between said stacking platform and said gripping position, said frame support operating to position said gripper frame for gripping only said upper rows during a first cycle and for transporting said gripper frame and upper rows gripped thereby to said stacking platform while leaving said lower rows at said gripping position, said frame support operating to position said gripper frame for gripping said lower rows during a second cycle and for transporting said gripper frame and said lower rows gripped thereby to said stacking platform, said frame support operating to invert said gripper frame during selected cycles for inverting the rows gripped by said frame during such selected cycles.

* * * * *